July 12, 1927.  E. E. ANSON  1,635,878
GATE
Filed Feb. 12, 1925
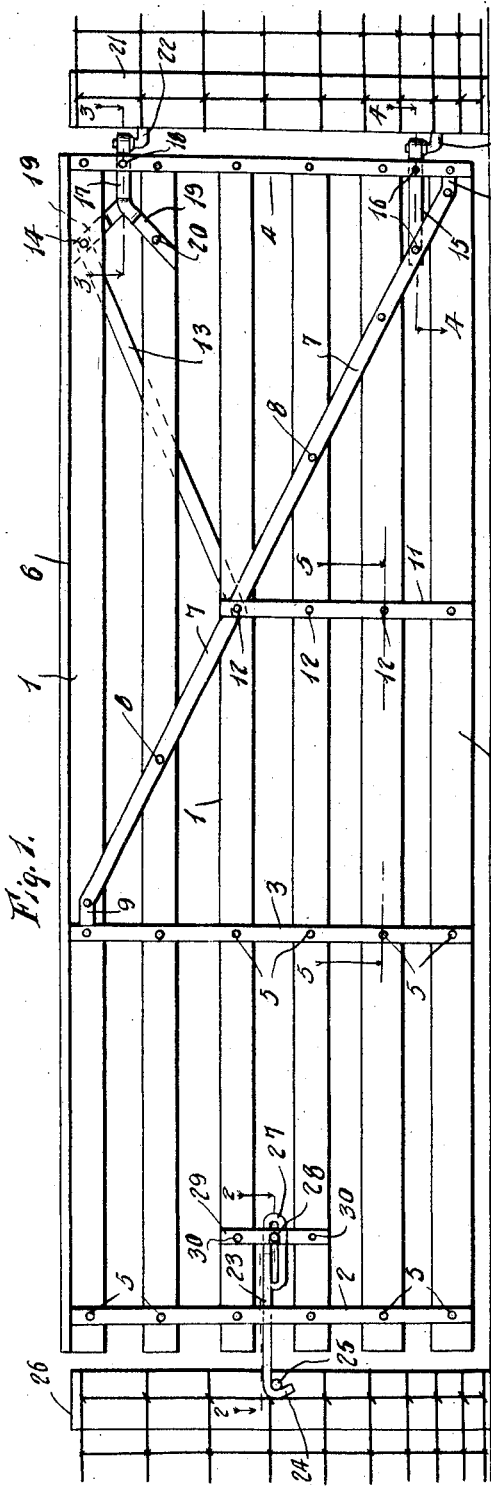
Inventor
E. E. Anson,
By
Attorney Patented July 12, 1927.

1,635,878

UNITED STATES PATENT OFFICE.

EDWARD E. ANSON, OF CLARKSVILLE, OHIO.

GATE.

Application filed February 12, 1925. Serial No. 8,836.

This invention relates to gates, and has for one of its objects the provision of a novel and simple device of this character which shall include horizontal slats, vertical bars connecting the slats together, and a novel and simple bracing structure adapted to prevent the gates from sagging on its hinges.

With the above and other objects in view, the invention consists of the construction, combination and arrangement of parts hereinafter fully described and claimed and illustrated in the accompanying drawing, wherein:

Figure 1 is a view in side elevation of a gate embodying my invention,

Figure 2 is a detail sectional view taken on the horizontal plane indicated by the line 2—2 of Figure 1, Figure 3 is a detail sectional view taken on the horizontal plane indicated by the line 3—3 of Figure 1, Figure 4 is a detail sectional view taken on the horizontal plane indicated by the line 4—4 of Figure 1, and Figure 5 is a detail sectional view taken on the horizontal plane indicated by the line 5—5 of Figure 1.

Corresponding and like parts are referred to in the following description, and designated in the accompanying drawing, by similar reference characters.

The gate comprises horizontal slats 1 and vertical bars 2, 3 and 4. The bars secure the slats together, and are arranged in pairs and secured to opposite sides of the slats 1 by bolts 5. The slats 1 are preferably made of wood and the bars of metal. The bars 2 are located adjacent the free end of the gate, the bars 4 at the hinged end of the gate, and the bars 3 between the vertical center of the gate and the bars 2. A rider board 6 is secured to the upper edge of the top slat 1.

The gate bracing means comprises diagonal bars 7 arranged on opopsite sides of the gate and extending from the upper ends of the bars 3 to the lower ends of the bars 4. The bars 7 are bolted to the slats 1 as at 8, and are provided at their upper ends with horizontal extensions 9 and at their lower ends with horizontal extensions 10. The extensions 9 and 10 project from the bars 7 in opposite directions, and the extensions 9 contact with the bars 3 and the extensions 10 with the bars 4. Vertical brace bars 11 are secured to the opposite sides of the gate by bolts 12, and are positioned between the bars 3 and 4 and extend downwardly from the brace bars 7 to the lower edge of the gate. A second inclined brace bar 13 extends upwardly from the connection between the inclined brace bars 7 and the vertical brace bars 11 in the direction of the hinged end of the gate. This brace bar is secured in place by one of the bolts 12 and a bolt 14.

A lower hinge strap 15 is secured to and between the bars 4 and 7 by bolts 16, and an upper hinge strap 17 is secured to and between the bars 4 by a bolt 18. The hinge strap 17 is provided with oppositely inclined arms 19 which are secured to the two adjacent slats 1 by the bolt 14 and a bolt 20. A post 21 carries pintles 22 which are received by the barrels of the hinge straps 15 and 17. The gate is equipped with a pivotally and slidably mounted latch 23 which is provided at its outer end with hook 24 for engagement with a pin 25 carried by a post 26 and which is provided at its inner end with an elongated loop 27 through which a pin 28 passes. This pin is carried by straps 29 secured to certain of the slats 1 by bolts 30, and the latch 23 is positioned between the straps and the bars 2.

The parts 7, 11, 13, 15, 17 and 19, constitute the bracing means for the gate. Due to the relative arrangement of these parts, to the manner in which they are connected together and to the slats 1, and to the contact between the part 7 and the bars 3 and 4, together with the manner in which the part 15 is connected to the slats 1 and bars 4 and the part 17 to said bars, the bracing means will positively prevent the gate from sagging on its hinges. All parts of the bracing means are made of metal and may be readily secured to the gate.

It should be understood that the drawing is merely illustrative and does not pretend to give exact proportions. Furthermore, the said drawing is illustrative of a preferred construction, it being my expectation that various changes and modifications may be made without departing from the spirit and scope of the invention.

What is claimed is:

A gate comprising horizontal slats, a vertical bar secured to the slats at the hinged end of the gate, a second vertical bar secured to the slats between the ends of the gate and located nearer the free than the hinged end thereof, a diagonal brace secured to the slats and extending from the lower end of said first bar to the upper end of said second bar and having horizontally disposed end portions contacting with said bars, a vertical brace positioned between said bars and extending downwardly from the diagonal brace, said vertical brace being located nearer the second than the first of said bars and secured to the diagonal brace and certain of the slats, a second diagonal brace extending upwardly from the point of connection between said first diagonal brace and vertical brace in the direction of the hinged end of the gate, a lower strap positioned between a pair of the slats and secured to said first vertical bar and said first diagonal brace, an upper strap positioned between another pair of the slats and secured to said first bar, said upper strap being provided with oppositely inclined arms secured to said last named pair of slats and the second inclined brace, and a vertical bar secured to the slats adjacent the free end of the gate.

In testimony whereof I affix my signature.

EDWARD E. ANSON.